A. O. WHEELER.
Tire Tightener.

No. 109,982. Patented Dec. 6, 1870.

Witnesses:

Inventor:
A. O. Wheeler
Per
Attorneys.

United States Patent Office.

AARON O. WHEELER, OF ST. AUGUSTINE DEPOT, ILLINOIS.

Letters Patent No. 109,982, dated December 6, 1870.

---

IMPROVEMENT IN THE MODE OF SETTING TIRES ON WHEELS.

---

The Schedule referred to in these Letters Patent and making part of the same.

---

To all whom it may concern:

Be it known that I, AARON O. WHEELER, of St. Augustine Depot, in the county of Knox and State of Illinois, have invented a new and improved Mode of Setting Tires on Wheels; and I do hereby declare that the following is a full, clear, and exact description thereof, which will enable others skilled in the art to make and use the same, reference being had to the accompanying drawing forming part of this specification.

My invention relates to the well-known sliding joint, where a tapering screw and divided nut are set between two fellies, to tighten the tire; and It consists in combining with the nut and screw a peculiarly-constructed clasp-plate.

In the accompanying drawing—

Figure 1 gives a side view of a wheel provided with my device for tightening the tire.

These figures, 2 and 3, show the screw and nut as applied to the ends of the felly, the former showing the screw longitudinally, and the latter in cross-section.

Similar letters of reference indicate corresponding parts.

A is the felly.

B, the tire.

C is a clasp-plate, which incloses the ends of the felly.

Figure 1:
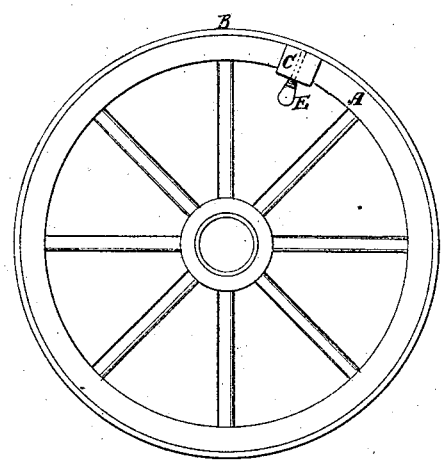
Figure 2:
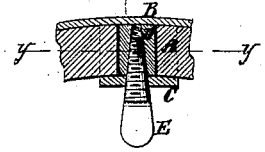
Figure 2 is a section of fig. 3, in the line $x\,x$.
Figure 3:
Figure 3 is a section of fig. 2, on the line $y\,y$.

D represents a screw-nut, made in two parts, which occupies the space between the end of the felly within the clasp-plate, as seen in figs. 2 and 3.

E is a tapering screw, which engages with the nut D.

As this screw is turned in it serves to spread the ends of the felly apart, and, consequently, to enlarge the diameter of the wheel, and cause the felly to tightly fit the tire when from any cause the latter has become loose.

By turning the screw back the opposite result is produced, and the felly is loosened from the tire should the latter have been set too tight.

By this means the tire may always be kept tight on the felly and the durability of the wheel thereby greatly increased.

Having thus described my invention,

I claim as new and desire to secure by Letters Patent—

The combination, with an ordinary divided nut and conical screw, of a plate, C, beveled internally, and thickened toward the center, to clasp the ends and under side only of the felly, and to form a strong and secure joint, which will not yield to lateral torsion or allow the wheel to be twisted out of a true vertical plane.

AARON O. WHEELER.

Witnesses:
ANSON BALDWIN,
ASA BUTLER.